United States Patent
Brown et al.

(10) Patent No.: US 9,457,297 B2
(45) Date of Patent: Oct. 4, 2016

(54) METHOD OF SECURING FILTER ELEMENTS

(71) Applicant: Lawrence Livermore National Security, LLC, Livermore, CA (US)

(72) Inventors: Erik P. Brown, Tracy, CA (US); Jeffery L. Haslam, Livermore, CA (US); Mark A. Mitchell, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 290 days.

(21) Appl. No.: 13/693,984

(22) Filed: Dec. 4, 2012

(65) Prior Publication Data

US 2014/0151282 A1    Jun. 5, 2014

(51) Int. Cl.
- *B01D 46/24* (2006.01)
- *B01D 29/52* (2006.01)
- *B01D 35/30* (2006.01)

(52) U.S. Cl.
CPC .......... *B01D 29/52* (2013.01); *B01D 46/2407* (2013.01); *B01D 35/306* (2013.01); *B01D 46/2414* (2013.01); *B01D 2201/0453* (2013.01)

(58) Field of Classification Search
CPC .......... B01D 2201/0438; B01D 29/52; B01D 2201/0453; B01D 35/306; B01D 46/2414; B01D 46/2407; B01D 2201/0483; B01D 27/142; B01D 29/336; B01D 29/356; B01D 46/00; B01D 46/02
See application file for complete search history.

(56) References Cited

U.S. PATENT DOCUMENTS

| | | | | |
|---|---|---|---|---|
| 2,904,184 | A * | 9/1959 | Daley | B01D 29/21 210/323.2 |
| 3,118,837 | A * | 1/1964 | Briggs | 210/323.2 |
| 3,442,390 | A * | 5/1969 | Barmore et al. | 210/323.2 |
| 3,992,177 | A * | 11/1976 | Welteroth | 55/288 |
| 4,298,474 | A * | 11/1981 | Sillers, Jr. | 210/238 |
| 4,407,664 | A * | 10/1983 | Sillers, Jr. | B01D 46/0005 55/357 |
| 4,574,048 | A * | 3/1986 | van den Broek | B01D 29/114 210/136 |
| 4,632,681 | A | 12/1986 | Brunner | |
| 4,997,561 | A * | 3/1991 | Schutz | 210/232 |
| 5,173,186 | A * | 12/1992 | Spafford et al. | 210/455 |
| 6,241,885 | B1 * | 6/2001 | Moddemeijer | B01D 29/114 210/232 |
| 7,959,803 | B2 | 6/2011 | Antoun | |
| 8,197,685 | B2 | 6/2012 | Ribet et al. | |
| 2012/0111786 | A1* | 5/2012 | Chiang | B01D 29/111 210/238 |

FOREIGN PATENT DOCUMENTS

TW    201138925 A  *  11/2011

* cited by examiner

*Primary Examiner* — Thomas M Lithgow
(74) *Attorney, Agent, or Firm* — Eddie E. Scott

(57) ABSTRACT

A filter securing system including a filter unit body housing; at least one tubular filter element positioned in the filter unit body housing, the tubular filter element having a closed top and an open bottom; a dimple in either the filter unit body housing or the top of the tubular filter element; and a socket in either the filter unit body housing or the top of the tubular filter element that receives the dimple in either the filter unit body housing or the top of the tubular filter element to secure the tubular filter element to the filter unit body housing.

3 Claims, 7 Drawing Sheets

METHOD OF SECURING FILTER ELEMENTS

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to filters and other equipment and more particularly to securing filter elements.

2. State of Technology

U.S. Pat. No. 8,197,685 for a filter element, securing ring and method for filtering provides the state of technology information reproduced below.

One basic idea of the invention is to achieve a reliable and leak-proof connection of two connecting means by radially pressing one connecting means against the other. The radial pressing enhances the tightness of the connection and seals the two connecting means.

An important aspect of the invention is to provide a separate element—namely the securing ring—in addition to the first and second connecting means in order to tightly couple the connecting means. The provision of a separate element allows for a quick and easy assembly of the filter element. In a first step, the tubular portion of the first connecting means is introduced into the tubular portion of the second connecting means. This step can be easily accomplished without an excessively tight fit, i.e. high friction, between the two connecting means. In a second step, the securing ring is inserted into the tubular portion of the first connecting means, pressing the tubular portion of the first connecting means against the tubular portion of the second connecting means. With the securing ring, the friction between the two elements is increased, achieving a friction fit and/or a sealed connection between the first and second connecting means.

In order for the pressure exerted by the securing ring to be transferred via the first connecting means to the second connecting means, it is preferred by the invention that at least one of the first and second connecting means comprises a resilient material, particularly a rubber material. The resilient material can also be a thermoplastic elastomer. In this regard, it is particularly preferred that the first connecting means is made up of a resilient material. In other words, the first connecting means should be adapted to allow for an at least slight increase of the diameter of its for example tubular portion.

Another preferred embodiment of the invention is characterized in that the tubular portions of the first and second connecting means comprise corresponding engagement means provided on an outer surface of the tubular portion of the first connecting means and an inner surface of the tubular portion of the second connecting means, respectively. These additional engagement means enhance the tightness of the connection by providing a form-locking or snap connection in addition to the frictional connection. Moreover, the engagement means can assist an operator in identifying a desired relative position of the two connecting means by providing a tactile feedback once the desired position is reached. The engagement means preferably include at least one protrusion and one recess, in particular a circular protrusion and a corresponding circular recess. The protrusion and the recess could also comprise another cross-sectional shape like a square or rectangle etc.

According to another preferred embodiment, the first connecting means comprises a ring-shaped receiving portion provided at an inner surface of its tubular portion for receiving the securing ring. The receiving portion is preferably constructed as a circular groove having a width substantially equal to a width of the securing ring. The receiving portion allows for a defined placement of the securing ring in the tubular portion of the first connecting means. Moreover, the receiving portion securely retains the securing ring in place.

U.S. Pat. No. 7,959,803 for devices, systems and methods for securing and sealing filter media elements in separation systems provides the state of technology information reproduced below.

The present invention relates to devices, systems and methods for securing and sealing filter media in separation systems, and, particularly to devices, systems and methods for securing filter media elements in separations systems for the separation of particulates from fluids.

In a number of situations arising in many settings, it is desirable to separate mixtures of materials. For example, it is often desirable to remove particles from a liquid "contaminated" with such particles. For example, in the machining industry coolant liquid becomes contaminated with metal particles. Such particles can be separated using filter media elements such as filter bags, baskets and cartridges which separate by size exclusion.

Some separations systems have used O-ring type seals in an attempt to limit leakage of fluid to be filtered around a filter element with limited success. See, for example, U.S. Pat. No. 5,462,678, in which an O-ring is used to form a seal between an outer sieve basket and an inner wall of a separation system housing. Indeed, although there has long been a need to decrease the amount of such leakage, currently available separation systems have been unable to satisfy that need.

It is desirable to develop improved devices, systems and methods that reduce or eliminate the above-identified and other problems associated with currently available separation systems.

U.S. Pat. No. 4,632,681 for a locking apparatus for filter elements provides the state of technology information reproduced below.

This invention relates to locking apparatus for filter elements, and more particularly, to apparatus for releasably locking one or more filter elements into sealing engagement with a tube sheet or the like in a dust collector filter assembly.

By way of background, dust collectors of the type here contemplated generally include a large housing divided by a tube sheet into a lower dirty air chamber and an upper clean air chamber. Several rows of cylindrical filter elements are releasably mounted in the lower chamber in sealing engagement with the lower surface of the tube sheet so that their open upper ends register respectively with corresponding openings in the tube sheet and the interiors of the elements communicate with the upper clean air chamber. More specifically, each filter element is provided with a mounting plate in the form of a flange surrounding its upper end and it is these flanges that are mounted in sealing engagement with the tube sheet, a suitable gasket being secured to each mounting plate about the open upper end of the filter elements for effecting an air tight seal with the tube sheet.

Air laden with dust particles, for example, is fed into the lower chamber and passes through the filter elements, which remove the particles from the air, and thence into the upper chamber from which the filtered, clean air may be taken.

It is known to clean the filter elements periodically by applying downwardly directed pulses of air to the interior of each element in opposition to the direction of flow of the air being treated, thus releasing accumulated dust particles from the filter elements. The released particles accumulate in the lower chamber from which they can be removed. While this procedure of course extends the life of the filter elements, they must nevertheless be replaced from time to time.

Heretofore the filter element replacement procedure has been cumbersome, time-consuming and unpleasant and efforts have been made to provide apparatus of the class described which reduce the difficulties and time necessary to replace the filter elements. Thus, it is known from U.S. Pat. No. 4,322,231 to provide a locking arrangement by which filter elements are releasably held against the underside of the apertured tube sheet which carries pairs of locking bars, each pair supporting a row of filter elements. Each bar is semicircular in cross-section so as to define a flat supporting surface and a curved camming surface, the bars being maintained in position by a number of support brackets fixed to transverse beams depending from the tube sheet. Each bracket is formed with at least a trough within which the bars are seated and a handle is affixed to each of the bars and extends perpendicularly from the longitudinal axis of its respective bar.

When the handles are in vertical position, the underside of mounting plates associated with the filter elements, are allowed to rest on the flat surfaces of the associated locking bars so that the filter elements can slide along the bars and out of the filter housing when replacement is required.

To secure the filter elements in active position, the handles are rotated to a horizontal position causing the curved camming surfaces to bear against the underside of the mounting plates forcing the filter elements into engagement with the undersurface of the tube sheet. A gasket is secured to each mounting plate about the open upper end of the filter elements to effect a seal with the tube sheet.

Each handle is equipped with an L-shaped supporting bracket so that when an adjacent pair of locking handles are in the horizontal position, each handle may rest within the L-shaped supporting bracket of the other to prevent the handles from pivoting back to their vertical positions to release the force securing the filter element mounting plates against the tube sheet.

When it is intended to release the filter elements from active position, one of the handles is slightly raised to clear the supporting bracket of the other handle so both handles can be lowered to vertical position to rotate the locking bars and release the force securing the filter elements in active position, whereupon they may be made to slide out of the housing.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for securing filter elements. This may be done in a housing (e.g., securing individual and/or grouped elements in a box or cylinder housing) or without a housing (e.g., securing individual and/or grouped filter elements against a plate or other object without a surrounding housing or enclosure). Filter elements can be secured individually, in groups, or altogether. The individual, group, or all filter elements may be secured by connecting to a surface, hanging from the surface, or by a triangle or other shaped plate connected to a support rod, post, or beam. The present invention provides a filter securing system including a filter unit body housing; at least one tubular filter element positioned in the filter unit body housing, the tubular filter element having a closed top and an open bottom; a dimple in either the filter cap or the frame unit; and a socket in either the filter cap or the frame unit that receives the dimple in either the frame unit or the filter cap of the tubular filter element to secure the tubular filter element to the filter unit body housing.

The system for securing filter elements of the present invention has use in an overall fluid stream system that can be used in military, nuclear, bio-tech (including pharmaceutical), chemical (including powder, wet-chemistry, and semi-conductor industries) systems, and power (e.g., coal). These systems may be ventilation systems (e.g., glove box, hot cell, fume hood, room exhaust, facility exhaust, or inlet) or process systems or test systems (e.g., for R&D purposes). The filter system can be used in existing or new military, nuclear, bio-tech, semiconductor fabrication, and/or chemical systems. They may be installed as part of new systems or retrofits of existing systems. Such facilities may include nuclear reactors, nuclear fuel processing, nuclear fuel testing, nuclear fuel storage, radioactive material processing, hazardous material processing (e.g., Be). The present invention has use in process environments such as fume hoods, semi-conductor processing, pharmaceutical processing and similar applications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1A:
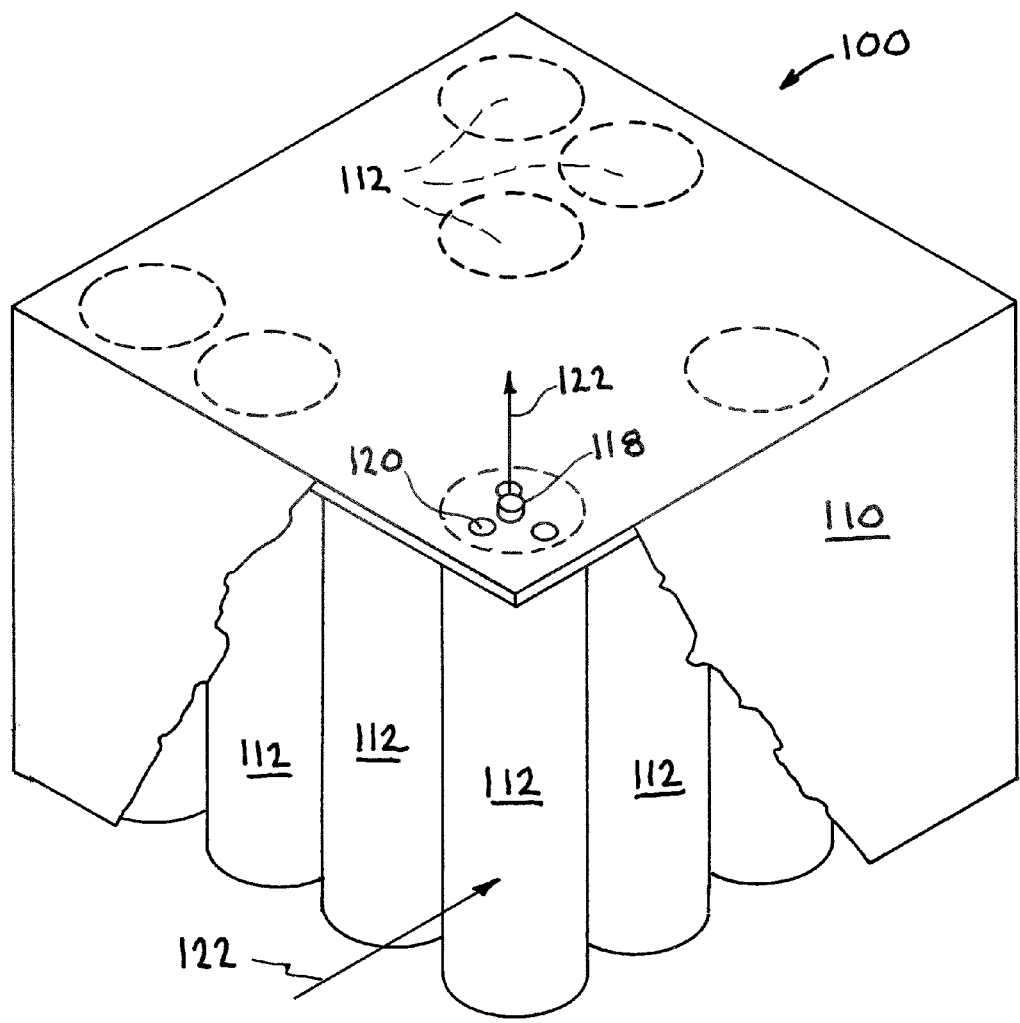
FIGS. 1A and 1B illustrate a prior art system.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Prior Art Filter System

Figure 1B:
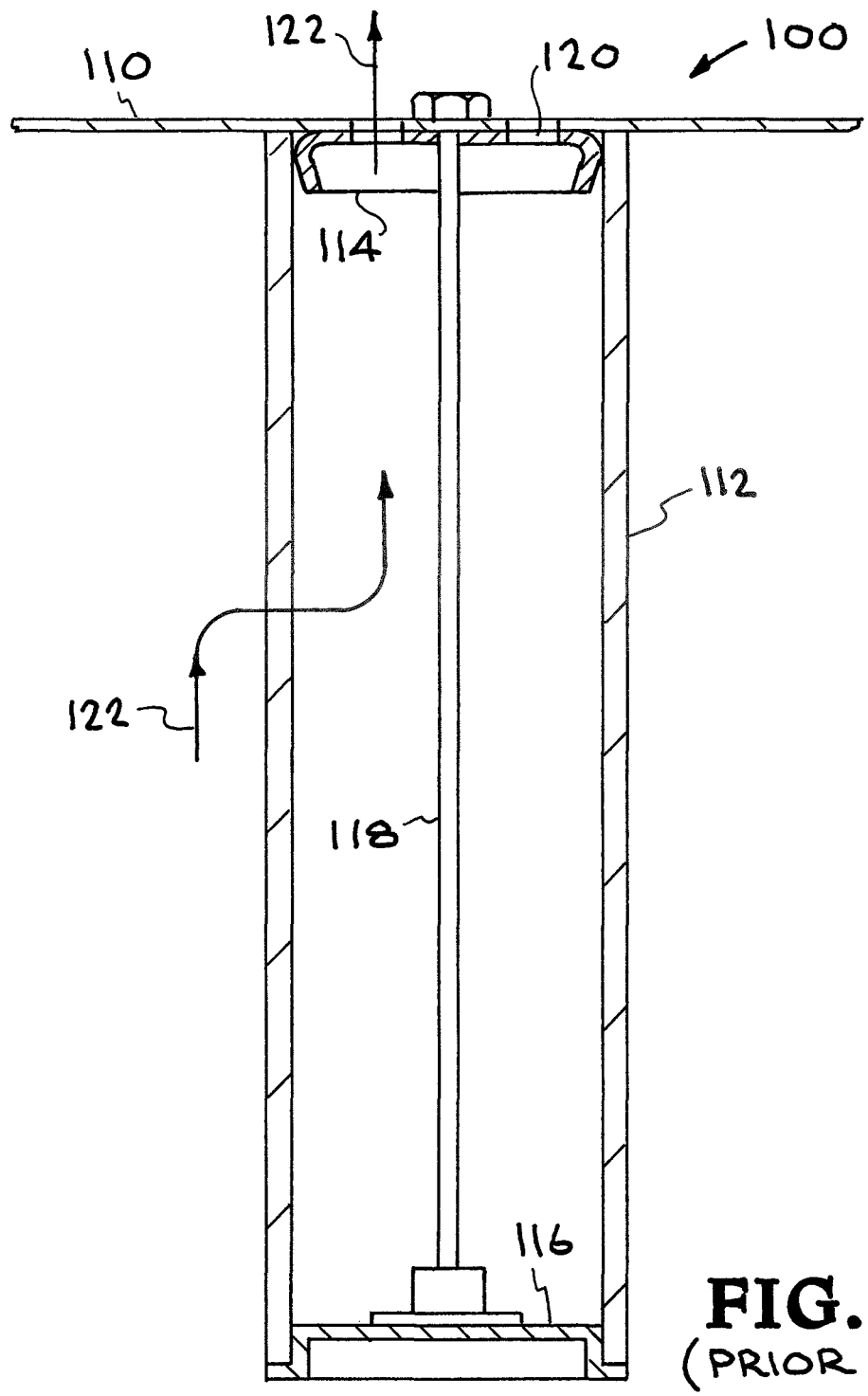

Referring now to the drawings and in particular to FIGS. 1A and 1B, one embodiment of a prior art filter system is illustrated. The prior art filter system is designated generally by the reference numeral 100. The prior art filter system 100 provides a filter array within a filter unit body 110. The filter unit body 110 is a housing that contains a multiplicity of tubular filter elements 112 housed in the filter unit body 110. The tubular filter elements 112 are attached to the top of the filter unit body 110. A bolt 118 is illustrated attaching the tubular filter elements 112 to the top of the filter unit body 110.

The tubular filter elements 112 are closed at the bottom. The tubular filter elements 112 have openings to allow flow through the top. This is illustrated by the openings 120 in the top of the filter unit body 110. The fluid to be filtered passes through the filter material that makes up the tubular filter elements 112 and exits through the openings 120 in the top of the filter unit body 110. This is illustrated by the arrow 122 illustrating that the fluid to be filtered passes through the filter material and exits through the openings 120.

Referring now to FIG. 1B, additional details of the prior art filter system 100 are illustrated. A multiplicity of tubular filter elements 112 are housed in the filter unit body 110. One of the tubular filter elements 112 is shown in FIG. 1B. The tubular filter element 112 is attached to the top of the filter unit body 110 by the bolt 118. The tubular filter element 112 is closed at the bottom by the frame 116. A frame 114 connects the tubular filter element 112 to the top of the filter unit body 110. The frame 14 has holes that match the holes 120 in the top of the filter unit body 110. The fluid to be filtered passes through the filter material that makes up the tubular filter element 112 and exits through the openings 120 in the top of the filter unit body 110. This is illustrated by the arrows 122 illustrating that the fluid to be filtered passes through the filter material and exits through the openings 120.

Problems with Prior Art Filter System

The prior art filter system requires a large number of holes 120 to be made in the top of the filter unit body 110 and the frame 114 must include holes that match the holes 120 in the top of the filter unit body 110. The prior art filter system utilizes a bolt 118 to hold the filter element 112 in place. Consequently the prior art filter system utilizes a large number of parts and requires and extensive amount of machining operations. Replacement of the filter elements 112 of the prior art filter system is a problem because the bolt 118 has to be removed, the old filter element 112 removed, a new filter element installed, and the bolt 118 reattached. The flow of the fluid to be filtered must pass through the openings in the frame 114 and through the openings 120 in the top of the filter unit body 110. This can cause pressure drop problems.

Improved Filter Securing System

Figure 2A:
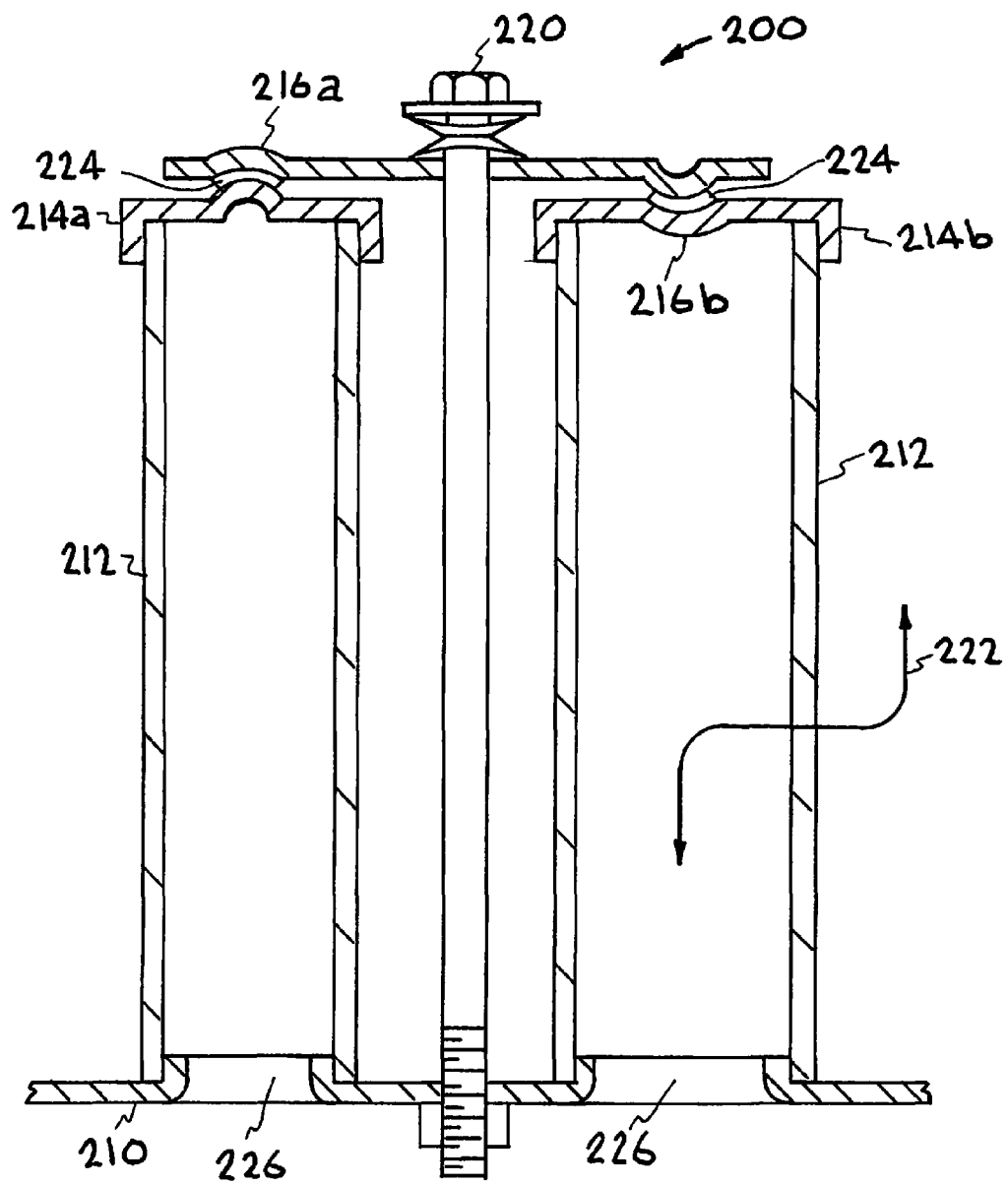
FIGS. 2A and 2B illustrate an improved filter securing system of the present invention.
Figure 2B:
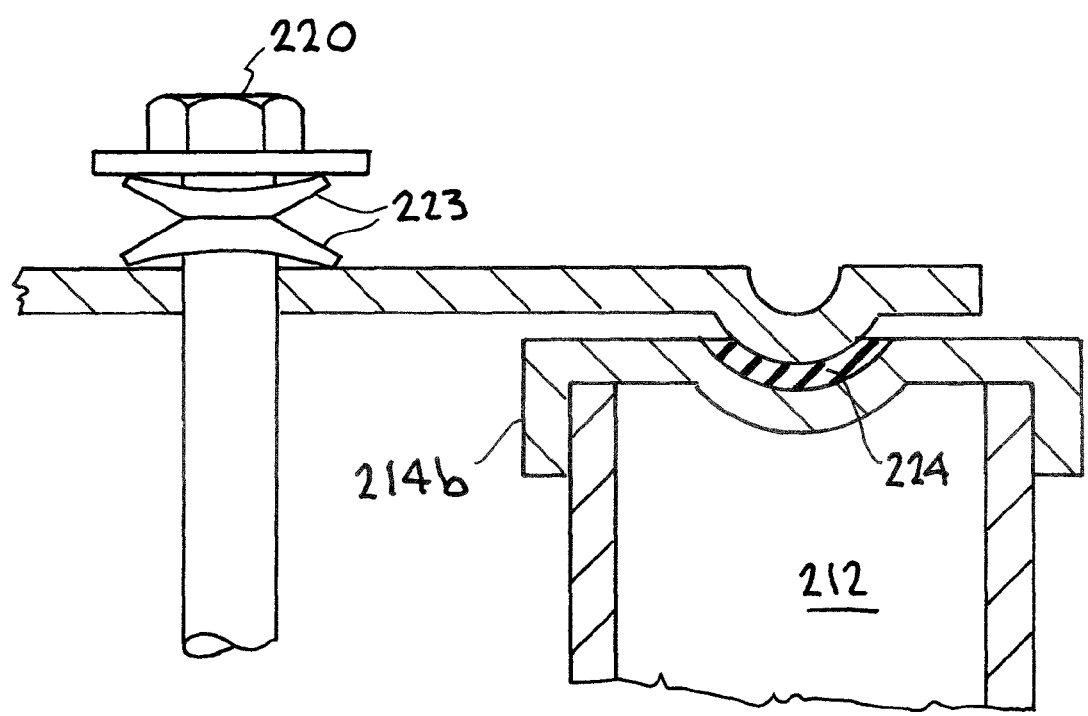

Referring now to the drawings and in particular to FIGS. 2A and 2B, an improved filter securing system of the present invention is illustrated. The improved filter securing system of the present invention is designated generally by the reference numeral 200. The improved filter securing system of the present invention 200 includes a filter unit body 210 that is a housing that contains a multiplicity of tubular filter elements 212 housed in the filter unit body 210. The tubular filter elements 212 are attached to the filter unit body 210 by improved filter securing system of the present invention.

The two filter array 200 includes the filter unit body housing 210 securing individual and/or grouped elements in a box or cylinder housing or without a housing securing individual and/or grouped filter elements against a plate or other object without a surrounding housing or enclosure. The filter elements 212 are secured individually, in groups, or altogether. The individual, group, or all filter elements may be secured by connecting to a surface, hanging from the surface, the frame unit 216a connected to a support rod, post, or beam 220 with equalizers 223 (spring, bevel washer, elastomeric material, etc.). A quick release cam may be used to secure the frame unit to the support rod, post, or beam 220.

Two tubular filter elements 212 that are connected to the filter unit body 210 by the improved filter securing system of the present invention are illustrated in FIG. 2A. A frame unit 216a connected to the filter unit body 210 by bolt 220, equalizer 223, and secures the two tubular filter elements 212 in place in the filter unit body 210. One of tubular filter element 212 has a filter cap 214a and the other tubular filter element 212 has a filter cap 214b, though they can be the same orientation The filter cap 214a has a dimple protruding from the filter cap 214a. The dimple protruding from the filter cap 214a is received in a socket 216a in the frame unit connected to the filter unit body 210 by bolt 220 and equalizer 223. The dimple protruding from the filter cap 214a received in the socket 216a secures the filter element 212 to the filter unit body 210.

The filter cap 214b has a socket 216b. The socket 216b receives a dimple protruding from the frame unit connected to the filter unit body 210 by bolt 220 and equalizer 223. The dimple and socket 216b secures the filter element 212 to the filter unit body 210.

Each tubular filter element 212 is open at the bottom and fits over a hole 226 in the filter unit body 210. The fluid to be filtered passes through the filter material that makes up the tubular filter element 212 and exits through the open bottom of the filter element 212 and through the hole 226 in the filter unit body 110. This is illustrated by the arrows 222 illustrating that the fluid to be filtered passes through the filter material and exits through the hole 226 in the filter unit body 210. The flow of fluid can be reversed as illustrated by the arrows 222.

The tubular filter elements 212 are secured to the filter unit body 210 by improved filter securing system of the present invention and the filter elements 212 can easily and quickly be replaced using the improved filter securing system of the present invention. The bolt 220 is loosed sufficiently to allow dimple and socket connection 216a and dimple and socket connection 216b to release the tubular filter elements 212. New tubular filter elements 212 are inserted and connections made with the dimple and socket connection 216a and dimple and socket connection 216b. The bolt 220 is tightened and the tubular filter elements 212 secured in place. As illustrated in FIG. 2B, a spring, bevel washers or elastomeric material may be inserted between the bolt 220 head and the frame unit 216a. The spring, bevel washers or elastomeric material improves even distribution of clamping forces and may allow the frame unit to be lifted and rotated without having to loosen or completely remove the bolt 220, making filter element 212 replacement even quicker and easier.

It is preferred by the invention that a resilient or sealing material, be introduced at the ends of the filter element to improve sealing characteristics. A resilient material may also be introduced between the frame unit 216a and the filter cap 214a, 214b to both improve the distribution of forces to each filter 212 and to allow for slight dimensional differences between filters, particularly in multiple (greater than two) filter arrays.

The improved design contains fewer parts per filter and provides greater flow capacity through the filter unit body.

Triangular Filter Array

Figure 3:
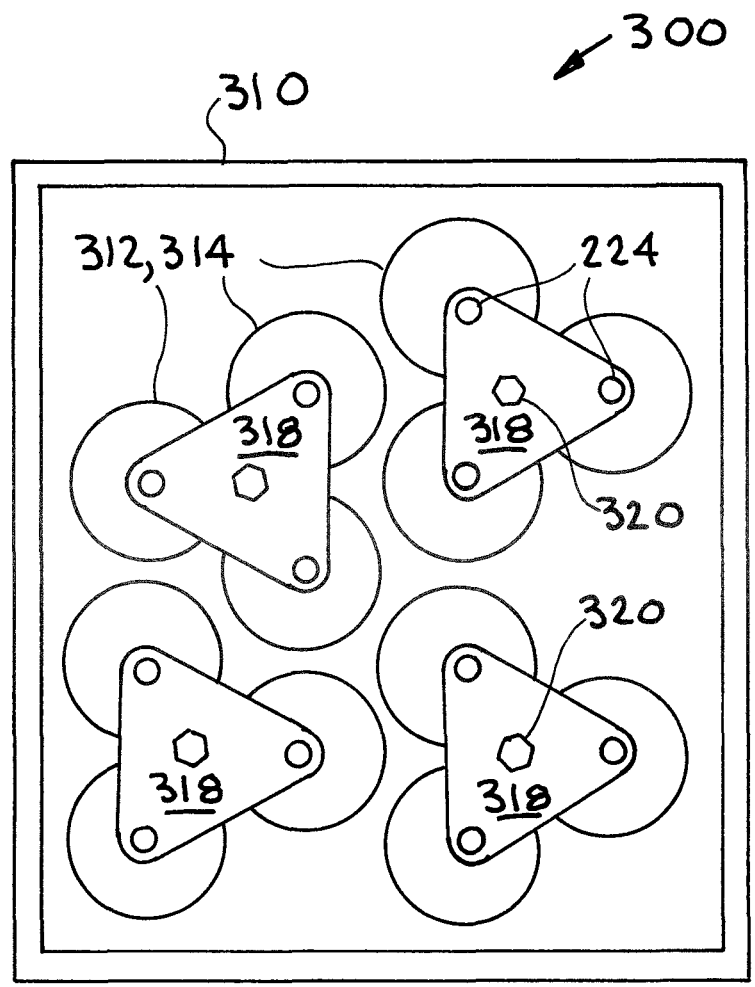
FIG. 3 illustrates another embodiment of an improved filter securing system of the present invention.

Referring now to FIG. 3, a triangular filter array of the present invention is illustrated. The triangular filter array is designated generally by the reference numeral 300. The triangular filter array 300 includes a filter unit body 310 that is a housing that contains a multiplicity of tubular filter elements 312 housed in the filter unit body 310. The tubular filter elements 312 are attached to the filter unit body 310 by the triangular filter array filter securing system of the present invention.

The triangular filter array 300 includes the filter unit body housing 310 securing individual and/or grouped elements in a box or cylinder housing or without a housing securing individual and/or grouped filter elements against a plate or other object without a surrounding housing or enclosure. The filter elements 312 are secured individually, in groups, or altogether. The individual, group, or all filter elements may be secured by connecting to a surface, hanging from the surface, the triangle shaped frame unit 318 connected to a support rod, post, or beam 320 with equalizers.

The tubular filter elements 312 are secured to the filter unit body 310 by improved filter securing system of the present invention and the filter elements 312 can easily and quickly be replaced using the improved filter securing system of the present invention. The bolt 320 is loosed sufficiently to allow dimple and socket connection to release the tubular filter elements 312. New tubular filter elements 312 are inserted and connections made with the dimple and socket connection 224. The bolt 320 is tightened and the tubular filter elements 212 secured in place. Alternately or additionally a spring, bevel washers or elastomeric material may be inserted between the bolt 320 head and the frame unit 318. The spring, bevel washers or elastomeric material improves even distribution of clamping forces and may allow the frame unit to be lifted and rotated without having to loosen or completely remove the bolt 320, making filter element 212 replacement even quicker and easier.

It is preferred by the invention that a resilient or sealing material, be introduced at the ends of the filter element to improve sealing characteristics as illustrated in FIG. 2B. A resilient material 224 may also be introduced between the frame unit 318, filter cap 314 to both improve the distribution of forces to each filter 312 and to allow for slight dimensional differences between filters, particularly in multiple (greater than two) filter arrays. The improved design contains fewer parts per filter and provides greater flow capacity through the filter unit body.

Triangular & Trapezoid Filter Array

Figure 4:
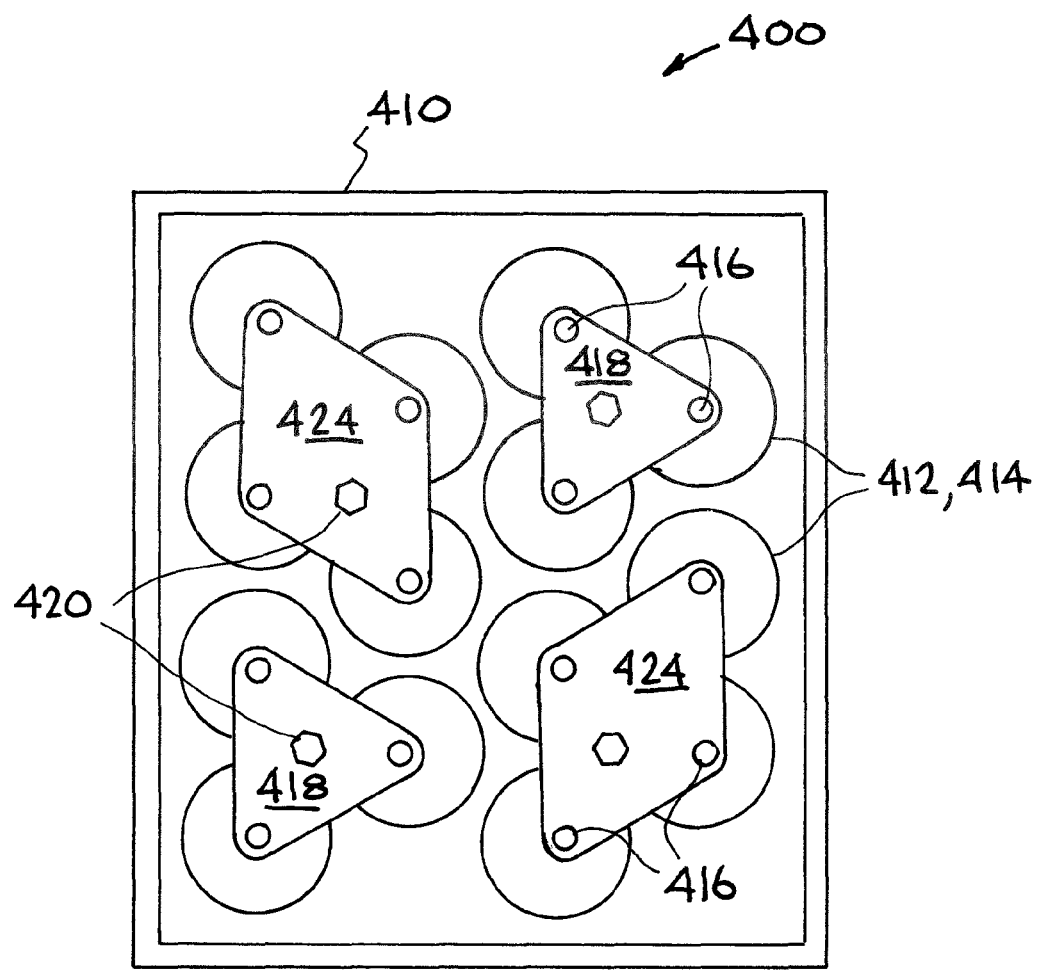
FIG. 4 illustrates yet another embodiment of an improved filter securing system of the present invention.

Referring now to FIG. 4, a triangular and trapezoid filter array of the present invention is illustrated. The triangular and trapezoid filter array is designated generally by the reference numeral 400. The triangular and trapezoid filter array 400 includes a filter unit body 410 that is a housing that contains a multiplicity of tubular filter elements 412 housed in the filter unit body 410. The tubular filter elements 412 are attached to the filter unit body 410 by the triangular and trapezoid filter array filter securing system of the present invention.

The triangular and trapezoid filter array 400 includes the filter unit body housing 410 securing individual and/or grouped elements in a box or cylinder housing or without a housing securing individual and/or grouped filter elements against a plate or other object without a surrounding housing or enclosure. The filter elements 412 are secured individually, in groups, or altogether. The individual, group, or all filter elements may be secured by connecting to a surface, hanging from the surface, the triangle shaped plate 418 and the trapezoid shaped plate 424 connected to a support rod, post, or beam 420.

The tubular filter elements 412 are secured to the filter unit body 410 by improved filter securing system of the present invention and the filter elements 412 can easily and quickly be replaced using the improved filter securing system of the present invention. The bolt 420 is loosed sufficiently to allow dimple and socket connection 416 to release the tubular filter elements 412. New tubular filter elements 412 are inserted and connections made with the dimple and socket connection 416. The bolt 420 is tightened and the tubular filter elements 412 secured in place. Alternately or additionally a spring, bevel washers or elastomeric material may be inserted between the bolt 420 head and the frame unit 418, or 424. The spring, bevel washers or elastomeric material improves even distribution of clamping forces and may allow the frame unit to be lifted and rotated without having to loosen or completely remove the bolt 420, making filter element 412 replacement even quicker and easier.

It is preferred by the invention that a resilient or sealing material, be introduced at the ends of the filter element to improve sealing characteristics. A resilient material may also be introduced between the frame unit 418 or 424, and filter cap 414 to both improve the distribution of forces to each filter 412 and to allow for slight dimensional differences between filters, particularly in multiple (greater than two) filter arrays.

The improved design contains fewer parts per filter and provides greater flow capacity through the filter unit body.

Square Filter Array

Figure 5:
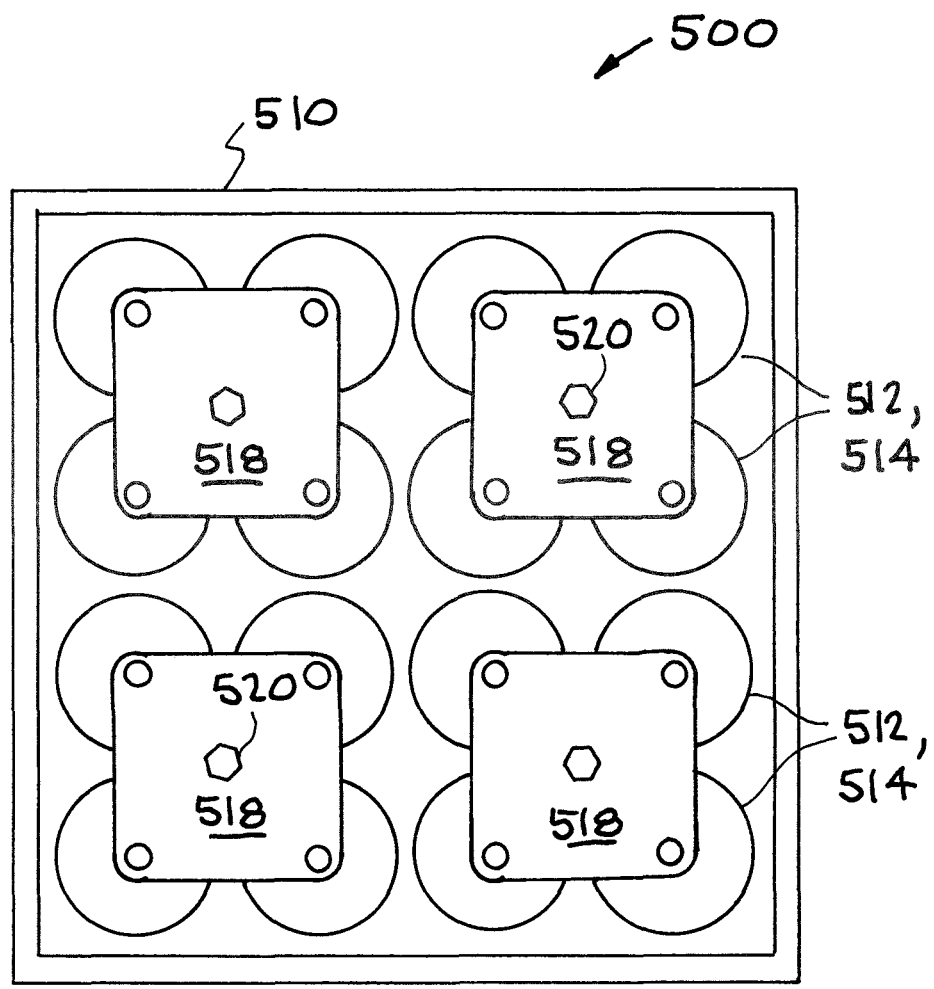
FIG. 5 illustrates another embodiment of an improved filter securing system of the present invention.

Referring now to FIG. 5, a square filter array of the present invention is illustrated. The square filter array is designated generally by the reference numeral 500. The square filter array 500 includes a filter unit body 510 that is a housing that contains a multiplicity of tubular filter elements 512 housed in the filter unit body 510. The tubular filter elements 512 are attached to the filter unit body 510 by the square filter array filter securing system of the present invention.

The square filter array 500 includes the filter unit body housing 510 securing individual and/or grouped elements in a box or cylinder housing or without a housing securing individual and/or grouped filter elements against a plate or other object without a surrounding housing or enclosure. The filter elements 512 are secured individually, in groups, or altogether. The individual, group, or all filter elements may be secured by connecting to a surface, hanging from the surface, the square shaped plate 518 connected to a support rod, post, or beam 520.

The tubular filter elements 512 are secured to the filter unit body 510 by improved filter securing system of the present invention and the filter elements 512 can easily and quickly be replaced using the improved filter securing system of the present invention. The bolt 520 is loosed sufficiently to allow dimple and socket connection 516 to release the tubular filter elements 512. New tubular filter elements 512 are inserted and connections made with the dimple and socket connection 524. The bolt 520 is tightened and the tubular filter elements 512 secured in place. Alternately or additionally a spring, bevel washers or elastomeric material may be inserted between the bolt 520 head and the frame unit 518. The spring, bevel washers or elastomeric material improves even distribution of clamping forces and may allow the frame unit to be lifted and rotated without having to loosen or completely remove the bolt 520, making filter element 412 replacement even quicker and easier.

It is preferred by the invention that a resilient or sealing material, be introduced at the ends of the filter element to improve sealing characteristics. A resilient material may also be introduced between the frame unit 518, filter cap 514 to both improve the distribution of forces to each filter 512 and to allow for slight dimensional differences between filters, particularly in multiple (greater than two) filter arrays.

The improved design contains fewer parts per filter and provides greater flow capacity through the filter unit body.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A filter securing apparatus, consisting of:

a filter unit body;

a multiplicity of tubular filter elements positioned on said filter unit body, each of said tubular filter elements consisting of a tubular filter and a filter cap closing a top of the tubular filter thereby defining a closed top of each tubular filter element and said tubular filter further consists of an open bottom defining an open bottom of each tubular filter element;

holes in said filter unit body, wherein said open bottoms of said tubular filter elements are positioned over said holes in said filter unit body;

a frame unit positioned over said closed tops and said filter caps;

a bolt connecting said frame unit to said filter unit body;

dimples in either said frame unit or said filter caps that close said tops of said tubular filter elements; and sockets in either said frame unit or said filter caps that close said tops of said tubular filter elements that receive said dimples in either said frame unit or said filter caps that close said tops of said tubular filter elements to secure said tubular filter elements to said filter unit body.

2. The filter securing apparatus of claim 1 wherein said dimples are located in said filter caps that close said tops of said tubular filter elements and said sockets are located in said frame unit to secure said tubular filter elements to said filter unit.

3. The filter securing apparatus of claim 1 wherein said dimples are located in said frame unit and said sockets are located in said filter caps that close said tops of said tubular filter elements to secure said tubular filter elements to said filter unit.

* * * * *